(12) United States Patent
Millet et al.

(10) Patent No.: US 11,572,151 B2
(45) Date of Patent: Feb. 7, 2023

(54) DRAIN CONFIGURED TO EVACUATE LEAKS OF FLUID, SUCH AS FUEL, FROM A LEAK COLLECTING SYSTEM OF AN AIRCRAFT, AND ASSOCIATED AIRCRAFT

(71) Applicant: Airbus Operations SAS, Toulouse (FR)

(72) Inventors: Gerard Millet, Pibrac (FR); Bruno Alquier, Blagnac (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 507 days.

(21) Appl. No.: 16/706,933

(22) Filed: Dec. 9, 2019

(65) Prior Publication Data

US 2020/0198757 A1 Jun. 25, 2020

(30) Foreign Application Priority Data

Dec. 20, 2018 (FR) ...................................... 1873472

(51) Int. Cl.
 *B64C 1/14* (2006.01)
 *F16L 11/12* (2006.01)
 *F16L 41/00* (2006.01)
 *F16L 57/02* (2006.01)

(52) U.S. Cl.
 CPC ............ *B64C 1/1453* (2013.01); *F16L 11/12* (2013.01); *F16L 41/001* (2013.01); *F16L 57/02* (2013.01)

(58) Field of Classification Search
 CPC . F16L 11/12; F16L 41/001; F16L 5/00; F16L 5/022; F16L 5/04; F16L 5/14; F16L 41/00; F16L 41/02; F16L 41/08; F16L 41/082; F16L 47/26; F16L 57/02; F16L 57/06; F16L 2201/20; F16L 9/14; B64C 1/1453

USPC .... 244/136; 285/1, 2, 3, 4, 16, 45, 238, 304
See application file for complete search history.

(56) References Cited

U.S. PATENT DOCUMENTS

| | | | |
|---|---|---|---|
| 4,720,204 A * | 1/1988 | Johnson ............................ | 285/2 |
| 5,161,828 A * | 11/1992 | Hynes ............................... | 285/2 |
| 5,397,155 A * | 3/1995 | Inda .................................. | 285/4 |
| 10,119,648 B2 | 11/2018 | Drane | |
| 2015/0075662 A1 | 3/2015 | Lee et al. | |

(Continued)

FOREIGN PATENT DOCUMENTS

| | | |
|---|---|---|
| CA | 2888851 A1 | 11/2015 |
| EP | 2853482 A1 | 4/2015 |
| FR | 2574153 A * | 6/1986 |

(Continued)

OTHER PUBLICATIONS

French Search Report; priority document.

*Primary Examiner* — Zachary T Dragicevich
*Assistant Examiner* — William S. Choi
(74) *Attorney, Agent, or Firm* — Greer, Burns & Crain, Ltd.

(57) ABSTRACT

A drain configured to evacuate leaks of fluid, such as fuel, from a leak collecting system of an aircraft, the drain comprising a rigid tube secured to a plate, the plate being configured to be attached to an external wall of the aircraft, a flexible pipe configured to join the collecting system to the rigid tube, one end of the flexible pipe being received within the rigid tube. The rigid tube comprises a channel, the channel being configured to allow separation of the rigid tube from the plate at the location of the channel.

9 Claims, 2 Drawing Sheets

(56) References Cited

U.S. PATENT DOCUMENTS

2015/0329195 A1 11/2015 Wielgosz
2017/0267368 A1 9/2017 Hara et al.

FOREIGN PATENT DOCUMENTS

| FR | 2734337 A1 | * | 11/1996 |
| FR | 2907099 A1 | | 4/2008 |
| GB | 957518 A | | 5/1964 |
| WO | 2014148921 A2 | | 9/2014 |

* cited by examiner

DRAIN CONFIGURED TO EVACUATE LEAKS OF FLUID, SUCH AS FUEL, FROM A LEAK COLLECTING SYSTEM OF AN AIRCRAFT, AND ASSOCIATED AIRCRAFT

CROSS-REFERENCES TO RELATED APPLICATIONS

This application claims the benefit of the French patent application No. 1873472 filed on Dec. 20, 2018, the entire disclosures of which are incorporated herein by way of reference.

FIELD OF THE INVENTION

The invention relates to a drain configured to evacuate leaks of fluid from a leak collecting system of an aircraft, and to an aircraft comprising a drain of this kind.

BACKGROUND OF THE INVENTION

In an aircraft, fluids such as fuel or fire-resistant hydraulic fluids are distributed towards the engines by a supply system, for example twin-walled pipes. In order to collect the fluids in the event of leaks and to avoid these being spilled within the aircraft, the supply system is connected to a leak collecting system. The latter is connected to a drain, one end of which is located outside the aircraft, for example on the wall of the engine pylon. The fluids are thus dissipated into the air instead of flowing along the wall, for example towards an engine. In order to ensure the durability of the drain, the outer end is rigid and is mounted on a wall of the aircraft by means of a plate. The plate and the end of the drain are generally made of titanium, aluminum or steel and the wall of the fuselage of the aircraft, and more specifically that of the engine pylon, is generally made of aluminum alloy or composite material.

When the aircraft is on the ground, there is a risk of the outer end of the drain being hit by ground support equipment such as an elevated platform or a step ladder. If the plate and the end of the drain are more robust than the wall of the aircraft, the wall of the aircraft can deform or rupture. It would then have to be replaced, grounding the aircraft.

SUMMARY OF THE INVENTION

A particular aim of the present invention is to provide a solution to this problem. It relates to a drain configured to evacuate leaks of fluid from a leak collecting system of an aircraft. A drain of this kind comprises:
  a rigid tube secured to a plate, the plate being intended to be attached to an external wall of the aircraft;
  a flexible pipe configured to join the collecting system to the rigid tube, one end of the flexible pipe being received within the rigid tube.

The invention is noteworthy in that the rigid tube comprises a channel, the channel being configured to allow separation of the rigid tube from the plate at the location of the channel.

Thus, in the event of ground support equipment hitting the rigid tube of the drain, the free end of the rigid tube breaks at the location of the channel and separates from the plate, and the external wall of the aircraft remains intact. The leaks of fluid are still evacuated in the air by virtue of the flexible pipe which remains in place until the drain is repaired.

According to various embodiments, which may be combined with one another:
  the channel is located close to that end of the rigid tube which is secured to the plate;
  the plate is intended to be attached to an external wall of an engine pylon of the aircraft;
  the rigid tube has a diameter of between 10 and 30 millimeters, preferably 19 millimeters, and a length of between 30 and 150 millimeters, preferably 80 millimeters;
  the rigid tube is made of titanium, aluminum, steel, plastic material or composite material;
  the flexible pipe is made of silicone or fluoro-silicone;
  the flexible pipe is fluorescent;
  the free end of the flexible pipe is configured to cooperate with a pump.

The invention also relates to an aircraft comprising a drain as described above.

BRIEF DESCRIPTION OF THE DRAWINGS

Other specifications, details and advantages of the invention will emerge more clearly from the following detailed description, which is given by way of example, with reference to drawings in which.

DETAILED DESCRIPTION OF THE PREFERRED EMBODIMENTS

Figure 1:
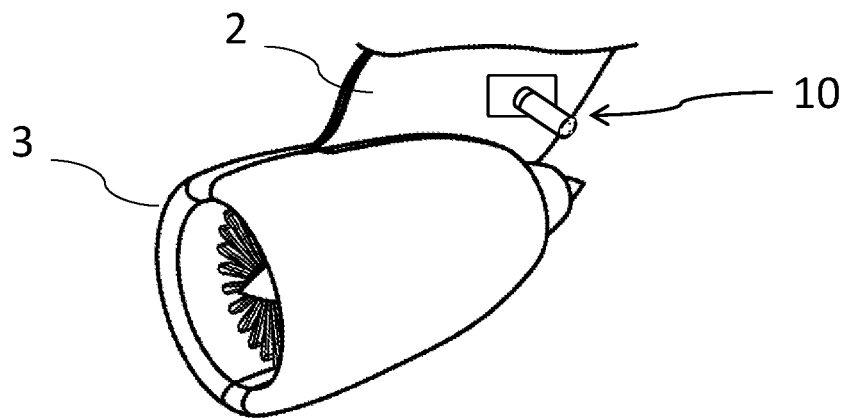
FIG. 1 shows an engine pylon of an aircraft, comprising a drain according to one embodiment of the invention.

An aircraft comprises a system for supplying fluid, such as fuel or fire-resistant hydraulic fluid, to an engine 3, shown in FIG. 1. The fluid supply system is connected to a leak collecting system 4, shown in FIGS. 3 and 4. To evacuate any leaks of fluid to outside the aircraft, the leak collecting system 4 is connected to a drain 10. The fluid supply system comprises, for example, twin-walled pipes and the leak collecting system 4 comprises, for example, rigid pipes.

Figure 2:
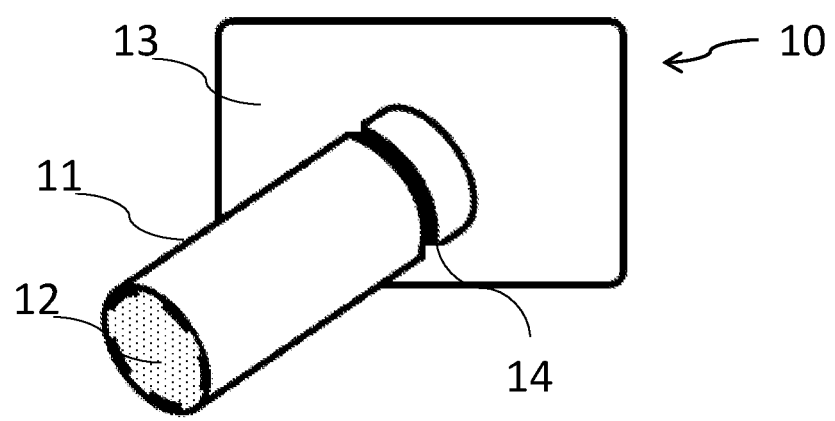
FIG. 2 shows the drain according to one embodiment of the invention.

The drain 10, shown in FIG. 2, comprises a rigid tube 11 that is secured to a plate 13 and a flexible pipe 12, one end of which is accommodated within the rigid tube 11. The plate 13 is configured to be attached to an external wall of the aircraft. The rigid tube 11 comprises a channel 14 configured to allow separation of the rigid tube 11 from the plate 13 at the location of the channel 14. For example, the channel 14 may be an annular groove extending around an external circumference of the rigid tube 11.

According to one embodiment, the channel 14 is located close to the plate 13, for example close to that end of the rigid tube 11 that is attached to the plate 13. As a variant, the channel 14 is located at the midpoint of the rigid tube 11.

The rigid tube 11 and the plate 13 may be welded together or screwed together. As a variant, the rigid tube 11 and the plate 13 may be machined in one piece, for example molded or machined from bulk.

Figure 3:
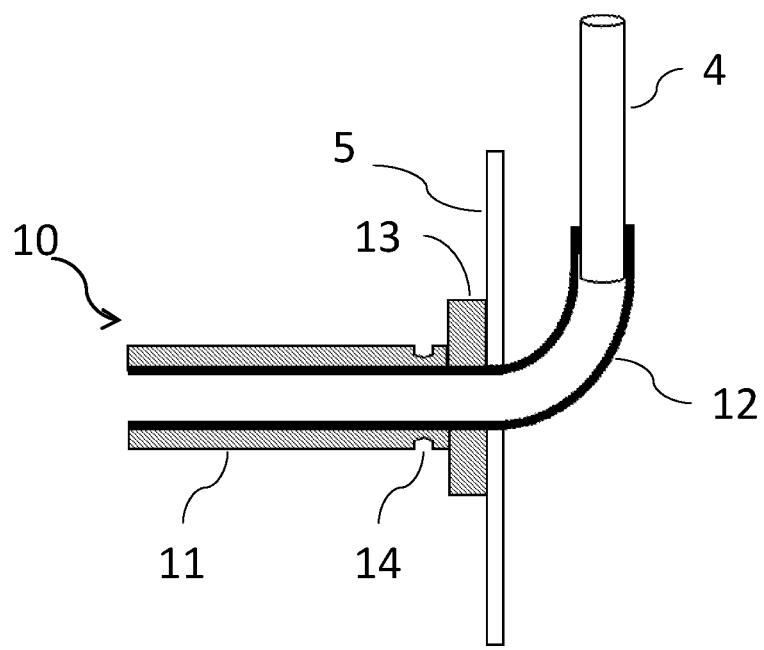
FIG. 3 shows a view in section of the drain of FIG. 2 mounted on a wall of the aircraft and connected to a fluid leak collecting system of the aircraft in a first configuration.

In use, as shown in FIG. 3, the drain 10 is mounted on an external wall 5 of the aircraft. The plate 13 is attached to the wall 5, for example by screwing, riveting, adhesive bonding or welding. The flexible pipe 12 is configured to join the leak collecting system 4 to the rigid tube 11. In this manner, in the event of leaks of fluid, these leaks are dispersed in the air. Thus, a first end of the flexible pipe 12 is accommodated within the rigid tube 11 and a second end cooperates with an end of the leak collecting system 4. For example, the second end of the flexible pipe 12 can fit directly onto the end of a rigid pipe of the collecting system 4, or be connected to the rigid pipe of the collecting system 4 by means of a sleeve.

Figure 4:
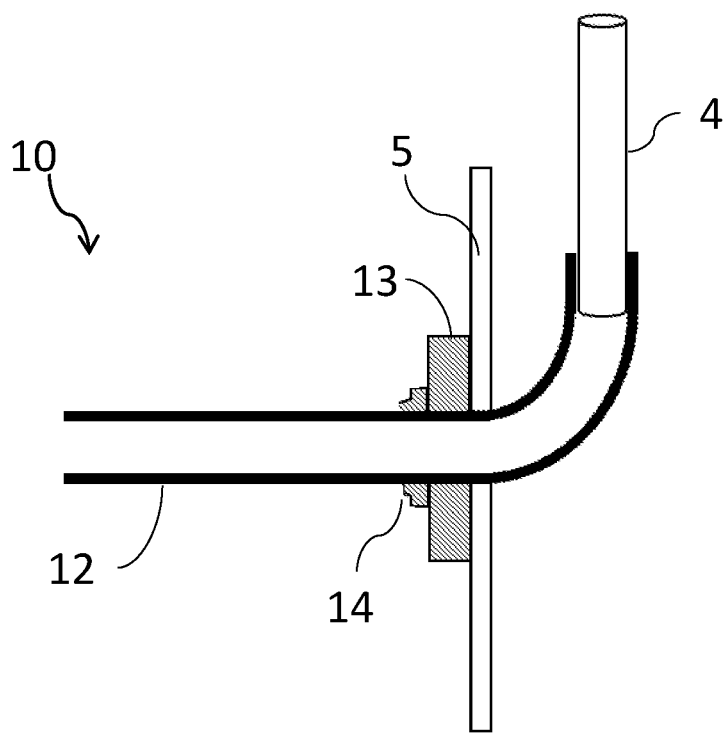
FIG. 4 shows a view in section of the drain of FIG. 2 mounted on a wall of the aircraft and connected to a fluid leak collecting system of the aircraft in a second configuration.

When the drain 10 receives an impact, for example from ground support equipment, the free end of the rigid tube 11 breaks at the location of the channel 14 and separates from the plate 13, which exposes the free end of the flexible pipe 12, as shown in FIG. 4. The drain 10 can thus continue to perform its role of evacuating leaks. Thus, only part of the drain 10 is affected by the collision with the ground support equipment.

Preferably, the color of the flexible pipe 12 contrasts with the color of the wall 5, allowing a ground operator or the pilot to identify the break and to request repair of the drain 10. According to one embodiment, the flexible pipe 12 is fluorescent.

According to various embodiments, the rigid tube 11 is made of titanium, aluminum, steel, plastic material or composite material and the flexible pipe 12 is made of silicone or fluoro-silicone. The rigid tube 11 has a diameter of between 10 and 30 millimeters, and a length of between 30 and 150 millimeters.

According to a first variant, the free end of the drain 10 is configured to be able to cooperate with a pump, configured to aspirate and extract the fluid present in the leak collecting system 4.

According to a second variant, the fluid is extracted passively, that is to say, without the aid of a pump, using, for example, the difference in pressure between the inside and the outside of the aircraft. Preferably, the drain 10 is, in that case, attached to an external wall of an engine pylon 2 of the aircraft, and the rigid tube 11 has a diameter of 19 millimeters and a length of 80 millimeters. In addition, the free end of the drain 10 is configured to be able to cooperate with a pump, configured to aspirate and extract the residual fluid present in the leak collecting system 4.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A drain configured to evacuate leaks of fluid from a leak collecting system of an aircraft, the drain comprising:
a tube secured to a plate, the plate configured to be attached to an external wall of the aircraft;
a pipe configured to join the collecting system to the tube, one end of the pipe being received within the tube;
wherein the pipe is flexible relative to a flexibility of the tube;
wherein the tube comprises a channel, the channel being configured to allow separation of the tube from the plate at a location of said channel,
wherein the channel is an annular groove extending around an external circumference of the tube.

2. The drain according to claim 1, wherein the channel is located adjacent to that end of the tube which is secured to the plate.

3. The drain according to claim 1, wherein the plate is configured to be attached to an external wall of an engine pylon of the aircraft.

4. The drain according to claim 1, wherein the tube has a diameter of between 10 and 30 millimeters, and a length of between 30 and 150 millimeters.

5. The drain according to claim 1, wherein the tube is made of titanium, aluminum, steel, plastic material or composite material.

6. The drain according to claim 1, wherein the pipe is made of silicone or fluoro-silicone.

7. The drain according to claim 1, wherein the pipe is fluorescent.

8. The drain according to claim 1, wherein a free end of the pipe is configured to cooperate with a pump.

9. An aircraft comprising a drain according to claim 1.

* * * * *